UNITED STATES PATENT OFFICE.

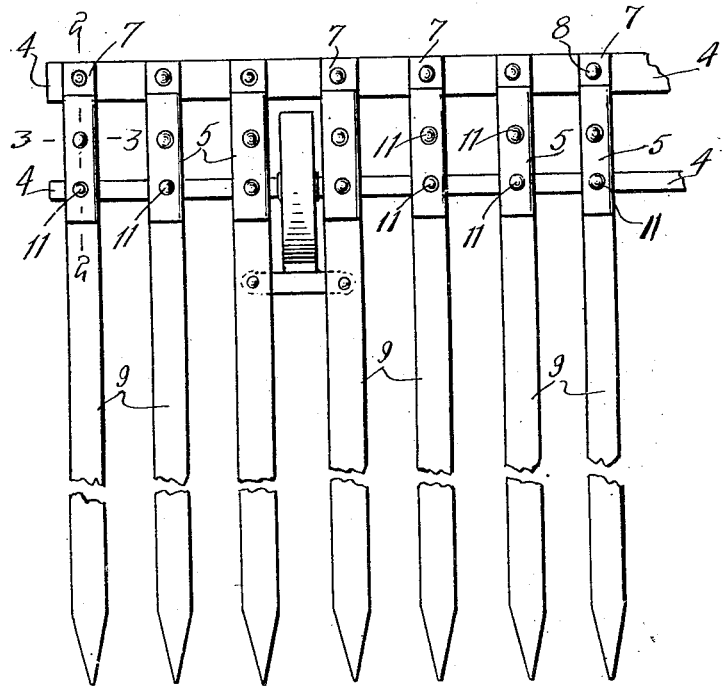
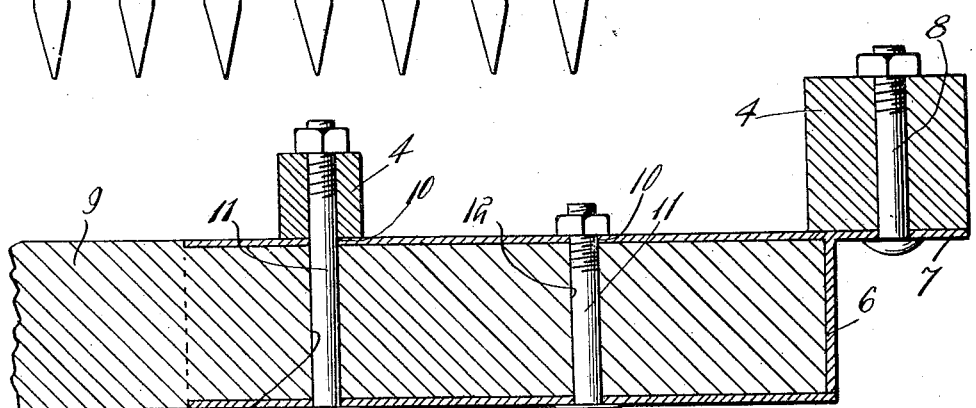
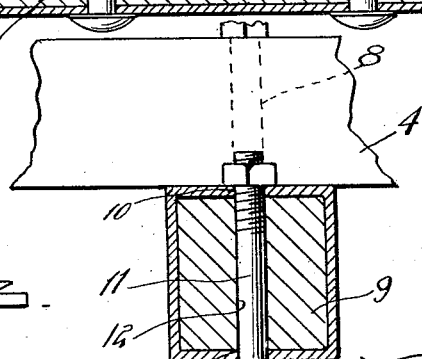

STEPHEN J. MADDEN, OF SALINA, KANSAS.

SWEEP-RAKE.

1,219,018. Specification of Letters Patent. Patented Mar. 13, 1917.

Application filed May 8, 1916. Serial No. 96,144.

*To all whom it may concern:*

Be it known that I, STEPHEN J. MADDEN, a citizen of the United States, residing at Salina, in the county of Saline, State of Kansas, have invented certain new and useful Improvements in Sweep-Rakes; and I do hereby declare the following to be a full, clear, and exact description of the invention, such as will enable others skilled in the art to which it appertains to make and use the same.

This invention relates to sweep rakes, and particularly to the teeth arrangements therefor.

The primary object of the invention is to provide simple and improved means whereby rake teeth may be quickly and easily attached to and detached from the rake sills, whereby broken rake teeth may be quickly and easily replaced without the necessity of the use of special tools or implements.

A further object of the invention is to provide a device of this character which is of improved construction, which is simple and inexpensive of manufacture, which is capable of being attached to sweep rakes of various shapes, sizes and constructions, and which will prove thoroughly efficient in the attainment of the ends for which it is designed.

With these objects in view, together with others which will appear as the description proceeds, the invention resides in the novel combination and arrangement of parts, all as will be described more fully hereafter, illustrated in the drawings and particularly pointed out in the claims.

The invention will be best understood by reference to the accompanying drawings, wherein:

Figure 1, is a bottom plan view of a conventional form of sweep rake and illustrating the application of teeth retaining means embodying the invention, Fig. 2, is a longitudinal sectional view taken on line 2—2 of Fig. 1, and Fig. 3, is a transverse sectional view taken on line 3—3 of Fig. 1.

Referring now more particularly to the drawings, 4 indicates the frame members or sills of a conventional form of sweep rake, to which the usual rake teeth or tines are secured.

Secured upon these sills or upon the frame of the rake in spaced parallel relation are housings 5. These housings are spaced apart a distance equal to the distance between the various teeth, and are preferably rectangular in cross section as shown. The rear ends of the housings are closed by a wall 6, and a rearwardly projecting flange 7 is arranged upon each housing, through which a bolt or screw 8 extends to secure the housing to the frame or sill. The forward end of each housing is open, and the rear ends of the rake teeth or tines 9 are adapted to be inserted within the housings and to snugly engage with the inner walls thereof. By a snug fit is meant such a fit as will prevent the tooth from rattling within the casing or housing, but not such a tight fit as would require the tooth to be driven into place, or which will tend to confine the air within the end of the casing. Spaced apertures 10 are arranged in each housing, through which bolts or pins 11 extend to firmly secure the teeth within the housings, the said teeth being provided with apertures 12 adapted to register with the housing apertures to receive the said bolts. The foremost of the bolts 11 extends through the housing and tooth and also through the adjacent portion of the rake frame, whereby the forward end of the housing is firmly held to the frame.

From this construction it is apparent that the rake teeth or tines are firmly held in proper position upon the frame, and yet in such manner that they may be quickly and easily removed therefrom should they become broken, or should they for any other reason be required to be detached from the frame. It is also obvious that the foremost bolt of each housing performs the two-fold function of securing the tine within the housing, and securing the latter to the rake frame.

While I have herein shown and described a particular or preferred embodiment of the invention, I wish it to be understood that I need not confine myself to all the precise details of construction herein set forth by way of illustration as modification and variation may be made without departing from the spirit of the invention or exceeding the scope of the claims appended hereto.

What is claimed is:

1. In a sweep rake, the combination with a rake frame including parallel transverse sills, of a housing extending across and secured to the sills, said housing consisting of an elongated receptacle for removably receiving the base of a rake tooth, the forward end of the housing being secured below the forward transverse sill and the rear end of the housing being provided with a rearwardly projecting plate which underlies the rearmost sill and constitutes a means for attaching the housing to the rearmost sill, and means securing said plate and said rearmost sill together.

2. In a sweep rake, the combination with a rake frame, including parallel transverse sills, of a housing extending across and secured below said sill, said housing consisting of an elongated receptacle for removably receiving the base of a rake tooth, and means for securing a tooth in the housing, said housing consisting of a tubular structure having its rear end closed and having a securing plate projecting beyond the closed end and underlying the rearmost sill whereby the housing may be secured to the latter without interfering with the removability of the rake tooth.

In testimony whereof, I affix my signature, in the presence of two witnesses.

STEPHEN J. MADDEN.

Witnesses:
 Jos. P. Burns,
 Paul S. Woods.

Copies of this patent may be obtained for five cents each, by addressing the "Commissioner of Patents, Washington, D. C."